US012614029B2

(12) United States Patent
Machida et al.

(10) Patent No.: US 12,614,029 B2
(45) Date of Patent: Apr. 28, 2026

(54) INFORMATION PROCESSING DEVICE, INFORMATION PROCESSING METHOD AND PROGRAM

(71) Applicant: NTT TechnoCross Corporation, Tokyo (JP)

(72) Inventors: Kenichi Machida, Tokyo (JP); Kazuhira Matsui, Tokyo (JP); Asato Tanaka, Tokyo (JP)

(73) Assignee: NTT TechnoCross Corporation, Tokyo (JP)

( * ) Notice: Subject to any disclaimer, the term of this patent is extended or adjusted under 35 U.S.C. 154(b) by 339 days.

(21) Appl. No.: 17/761,961

(22) PCT Filed: Jan. 14, 2022

(86) PCT No.: PCT/JP2022/001145
§ 371 (c)(1),
(2) Date: Mar. 18, 2022

(87) PCT Pub. No.: WO2022/209144
PCT Pub. Date: Oct. 6, 2022

(65) Prior Publication Data
US 2024/0012994 A1     Jan. 11, 2024

(30) Foreign Application Priority Data
Mar. 31, 2021    (JP) ................................. 2021-059678

(51) Int. Cl.
*G06F 40/279*          (2020.01)
*G10L 15/26*           (2006.01)

(52) U.S. Cl.
CPC ............ *G06F 40/279* (2020.01); *G10L 15/26* (2013.01)

(58) Field of Classification Search
CPC ...... G06F 40/279; G06F 40/169; G06F 40/30; G06F 40/205; G06F 40/289; G10L 15/26;
(Continued)

(56) References Cited

U.S. PATENT DOCUMENTS 8,428,227 B2 *    4/2013   Angel ..................... G10L 15/26
                                                              379/88.25
10,237,399 B1 *   3/2019   Gainsboro ........ H04M 3/42221
(Continued)

FOREIGN PATENT DOCUMENTS

JP          2006268149 A        10/2006
JP          2007081526 A        3/2007
(Continued)

OTHER PUBLICATIONS

"Time-Stamping Service", Time Business Accreditation Center, Internet < https://www.dekyo.or.jp/tb/contents/english/index.html>, Corresponding to Japanese Documents, <URL: https://www.dekyo.or.jp/tb/index.html>, cited in the Specification.
(Continued)

*Primary Examiner* — Paras D Shah
*Assistant Examiner* — Nadira Sultana

(57) ABSTRACT

An information processing device according to at least one embodiment has a specifying unit configured to specify the setting range for setting time-stamping, based on the content of a conversation between a plurality of people, the setting range being part or all of conversation data that represents the conversation, and a setting unit configured to set time-stamping for the specified setting range.

13 Claims, 7 Drawing Sheets

(58) Field of Classification Search
CPC ............ H04M 1/6505; H04M 3/42221; H04N
1/00244; H04L 51/04; H04L 63/126;
G06N 3/044
See application file for complete search history.

(56)                     References Cited

U.S. PATENT DOCUMENTS

| | | | | |
|---|---|---|---|---|
| 10,789,039 | B2 * | 9/2020 | Spiessbach | ......... G06F 3/04812 |
| 11,120,226 | B1 * | 9/2021 | Nudd | ...................... G06F 40/30 |
| 11,190,641 | B1 * | 11/2021 | Shukla | ................. G06F 40/279 |
| 11,636,216 | B2 * | 4/2023 | Unitt | ..................... H04L 9/0643 |
| | | | | 713/193 |
| 11,645,466 | B2 * | 5/2023 | Wang | ................... G06F 40/205 |
| | | | | 704/9 |
| 2006/0218404 | A1 * | 9/2006 | Ogura | ................ H04N 1/00244 |
| | | | | 713/178 |
| 2007/0064905 | A1 * | 3/2007 | Mizutani | ............. H04M 1/6505 |
| | | | | 379/207.03 |
| 2014/0045450 | A1 * | 2/2014 | Ballantyne | ........... H04L 63/126 |
| | | | | 455/404.2 |
| 2015/0149171 | A1 | 5/2015 | Goldman et al. | |
| 2019/0266240 | A1 * | 8/2019 | Georges | ................. G06N 3/044 |
| 2020/0169543 | A1 * | 5/2020 | Vaughn | ................... H04L 51/04 |
| 2021/0264921 | A1 * | 8/2021 | Reece | ................... G06F 40/169 |
| 2021/0319787 | A1 * | 10/2021 | Itoh | ....................... G06F 40/289 |

FOREIGN PATENT DOCUMENTS

| | | | | |
|---|---|---|---|---|
| JP | 2007135120 | A | 5/2007 | |
| JP | 2008113165 | A | 5/2008 | |
| JP | 2017102663 | A | 6/2017 | |
| WO | WO-2013047803 | A1 * | 4/2013 | ........... G06F 21/645 |

OTHER PUBLICATIONS

Japanese Patent Application No. 2023-510302, Office Action mailed Dec. 3, 2024, 6 pages with English Translation.
Japanese Patent Application No. 2023-510302, Office Action mailed Feb. 12, 2025, 3 pages with English Translation.

* cited by examiner

AUTHENTICATION MANAGEMENT DEVICE — 10

101
SPEECH RECOGNITION
TEXT CONVERSION
UNIT

102
CALL REASON
DETECTION UNIT

103
SETTING TYPE
SPECIFYING UNIT

104
WORD IDENTIFYING
UNIT

105
TIME-STAMPING
SETTING UNIT

106
CALL DATA
DB

107
CALL REASON
DB

108
SETTING
CONDITION
DB

109
TIME-STAMPING
MANAGEMENT
DB

| CALL REASON ID | CALL REASON NAME | DETECTION CONDITION | . . . |
|---|---|---|---|
| a-1 | PRODUCT GUIDE | BOTH: INSURANCE | . . . |
| a-2 | CONTRACT PROCEDURE | BOTH: CONTRACT | . . . |
| b-1 | ADDRESS CHANGE | CUSTOMER: ADDRESS CHANGE | . . . |
| c-1 | PAYMENT PROCESS | BOTH: PAYMENT | . . . |
| . . . | . . . | . . . | . . . |

| CALL REASON ID | SETTING TYPE | KEY WORD | TARGET DATA | SETTING RANGE | |
|---|---|---|---|---|---|
| a-1 | PART | CHARGE | TEXT, VOICE | 3 MINUTES BEFORE AND AFTER KEY WORD | ⋮ |
| | | WARRANTY | TEXT | 5 MINUTES BEFORE AND AFTER KEY WORD | ⋮ |
| | | ⋮ | ⋮ | ⋮ | ⋮ |
| a-2 | ALL | – | TEXT, VOICE | WHOLE PERIOD | ⋮ |
| ⋮ | ⋮ | ⋮ | ⋮ | ⋮ | ⋮ |

| TIME-STAMPING ID | CALL ID | CALL REASON ID | KEY WORD | TARGET DATA | SETTING RANGE | TIME STAMP TOKEN | ... |
|---|---|---|---|---|---|---|---|
| T001 | C001 | a-1 | CHARGE | TEXT, VOICE | 3 MINUTES BEFORE AND AFTER KEY WORD | ... | ... |
| T002 | C001 | a-1 | WARRANTY | TEXT | 5 MINUTES BEFORE AND AFTER KEY WORD | ... | ... |
| T003 | C002 | a-2 | – | TEXT, VOICE | WHOLE PERIOD | ... | ... |
| ... | ... | ... | ... | ... | ... | ... | ... |

INFORMATION PROCESSING DEVICE, INFORMATION PROCESSING METHOD AND PROGRAM

CROSS-REFERENCE TO RELATED APPLICATIONS

This application is a U.S. National Stage Application filed under 35 U.S.C. § 371 claiming priority to International Patent Application No. PCT/JP2022/001145, filed on Jan. 14, 2022, which application claims priority to and the benefit of JP Application No. 2021-059678, filed on Mar. 31, 2021, the disclosures of which are hereby incorporated herein by reference in their entireties.

BACKGROUND OF THE INVENTION

1. Field of the Invention

The disclosure herein relates to an information processing device, an information processing method and a program.

2. Description of the Related Art

A mechanism referred to as "time-stamping" has been known heretofore (see, for example, non-patent literature 1). By time-stamping given electronic data, it is possible to certify that the electronic data existed at a certain point in time, and that the electronic data has not been tampered with subsequently.

Meanwhile, in recent years, it has become easier to process voice data, and there is a need to apply time-stamping to the voice data of calls made at contact centers (also referred to as "call centers").

CITATION LIST

Patent Literature

Non-patent Literature 1: Time Business Accreditation Center, Internet <URL: https://www.dekyo.or.jp/tb/index-.html>

However, generally, a significant number of calls are made at contact centers, and applying time-stamping to all voice data will lead to increased access to the time-stamping authority (TSA), and increased costs. Furthermore, in recent years, there is a need to apply time-stamping not only to voice data, but also to the text data that is obtained by converting that voice data using speech recognition, and therefore the costs may increase even more.

However, if only the necessary range in call data, containing voice data and text data, is made subject to time-stamping, it is still possible to reduce the costs incurred for time-stamping.

SUMMARY OF THE INVENTION

It is a general object of the present invention to provide an information processing device, an information processing method and a program that substantially obviate one or more problems caused by the limitations and disadvantages of the related art. It is furthermore an object of the present disclosure, according to at least one embodiment, to reduce the costs incurred for time-stamping.

In order to achieve the above object, according to at least one embodiment, an information processing device has a specifying unit configured to specify the setting range for setting time-stamping, based on the content of a conversation between a plurality of people, the setting range being part or all of conversation data that represents the conversation, and a setting unit configured to set time-stamping for the specified setting range.

The present disclosure makes it possible to reduce the costs incurred for time-stamping.

BRIEF DESCRIPTION OF THE DRAWINGS

Other objects and further features of the present invention will be apparent from the following detailed description when read in conjunction with the accompanying drawings, in which:

FIG. 4 is a diagram showing an example of a call reason DB;

FIG. 5 is a diagram showing an example of a setting condition DB;

FIG. 7 is a diagram showing an example of a time-stamping management DB.

DESCRIPTION OF THE PREFERRED EMBODIMENTS

In the following, embodiments of the present invention will be described with reference to the accompanying drawings. The embodiment herein will illustrate a contact center, and a contact center system 1, which can reduce the costs incurred for time-stamping by making only the necessary range of call data at a contact center subject to time-stamping, which will be described below. Assume here that the call data may not only contain the voice data of calls between the contact center's operators and customers, but may also contain the text data, into which this voice data is converted using speech recognition.

However, a contact center is simply an example, and, besides contact centers, the present disclosure is equally applicable to, for example, targeting people in charge of marketing products and services, targeting people working at store counters, and so forth, and applying time-stamping to conversation data, containing the voice data of conversations held during marketing operations and over-the-counter operations, its text data, and so forth. Furthermore, although a contact center's operator will be described below as performing tasks such as answering a query from a customer in a voice call, this is by no means limiting, and the present disclosure is equally applicable when, for example, such tasks are performed using text chat (which may include stamps and attachments that can be sent and received, in addition to text), video calls (including calls in which electronic data on display can be shared), and so forth. In other words, the present disclosure is equally applicable even when the call data contains no voice data, and contains text data alone. More generally, the present disclosure is equally applicable when time-stamping is used for conversation data related to a number of people's conversations.

Note that time-stamping means that a time-stamping authority, which is a trusted business operator (trusted business operator for time-stamping services), assigns time information to the hash value of electronic data (also referred to as a "message digest"). A hash value to which time information is assigned is referred to as a "time stamp token" (or simply a "time stamp"), and this time stamp token certifies that the electronic data existed at the time represented by the time information, and that the electronic data has not been tampered with subsequently. In the following description, when given electronic data is time-stamped, this may be also referred to as "setting time-stamping for the electronic data" and the like.

<Overall Configuration>

Figure 1:
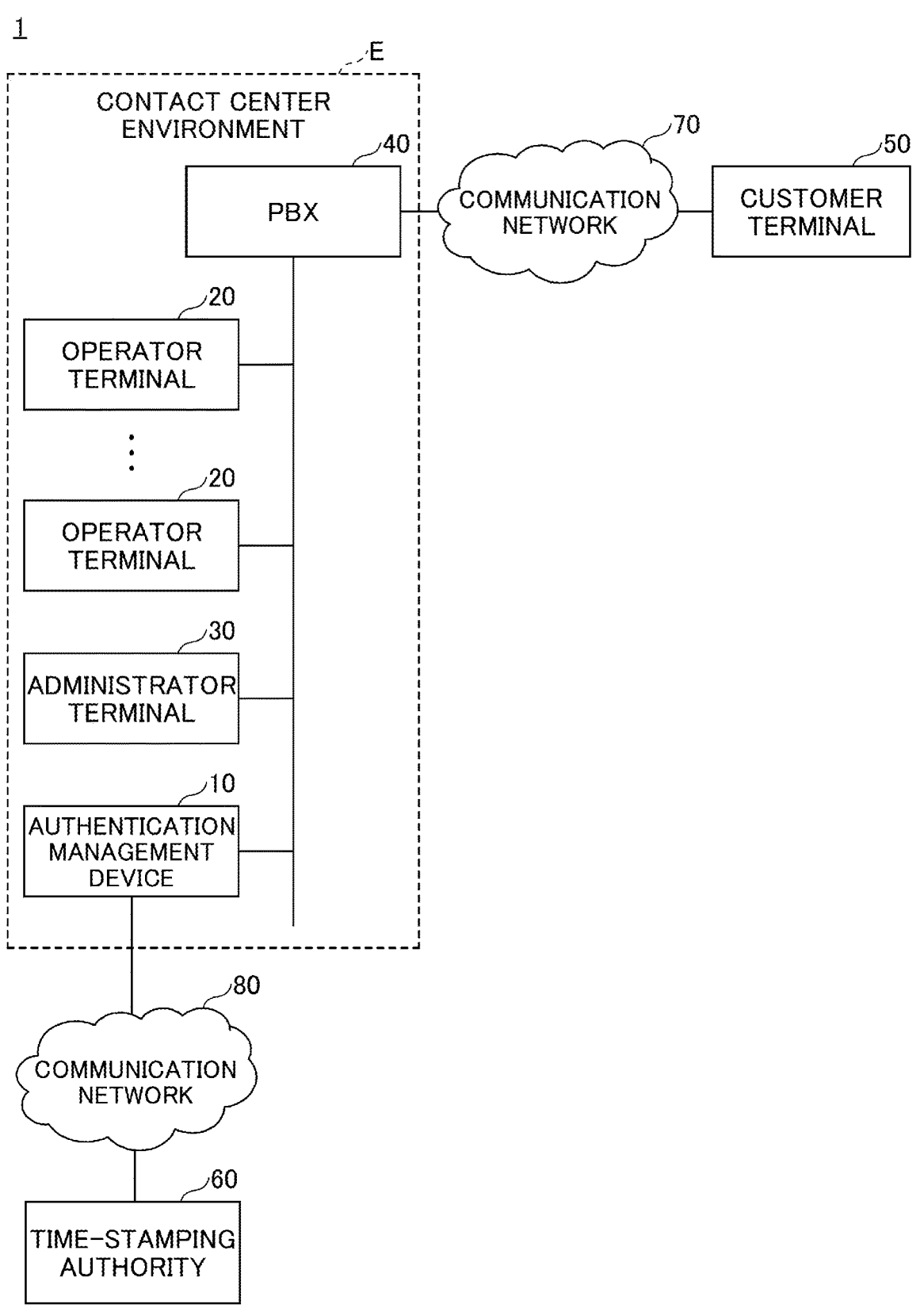
FIG. 1 is a diagram showing an example of an overall configuration of a contact center system according to the present embodiment.

First, an overall configuration of a contact center system 1 according to the present embodiment will be described below with reference to FIG. 1. FIG. 1 is a diagram showing an example of an overall configuration of the contact center system 1 according to the present embodiment.

As shown in FIG. 1, the contact center system 1 according to the present embodiment includes an authentication management device 10, an operator terminal 20, an administrator terminal 30, a PBX 40, a customer terminal 50, and a time-stamping authority 60. Here, the authentication management device 10, the operator terminal 20, the administrator terminal 30 and the PBX 40 are installed in a contact center environment E, which is a contact center's system environment. Note that the contact center environment E is by no means limited to being a system environment in the same building, and may be, for example, a system environment in a number of buildings that are geographically apart.

The authentication management device 10 extracts the necessary range, from at least one of the voice data of a call between a customer and an operator, and the text data that is obtained by converting that voice data using speech recognition, and then sets time-stamping for this extracted range (hereinafter also referred to as the "setting range"). That is, the authentication management device 10 calculates the hash value of the data of the setting range, and then requests this hash value's time-stamp token to the time-stamping authority 60, via a communication network 80, which may be the Internet and/or the like. Then, the authentication management device 10 saves the time stamp token returned from the time-stamping authority 60, with the call data. As a result of this, call data, in which time-stamping is applied only to the necessary range of the necessary data (voice data, text data, or both) is obtained.

Now, which of the voice data and the text data, or both, is subject to time-stamping, and which range is made the setting range are determined depending on the content of the call represented by the call data. To be more specific, these are determined based on the call reason of the call represented by the call data, words spoken during the call, and so forth. The "call reason" refers to the reason the customer made the call to the call center (the reason for an incoming call), and is the content of the customer's query, for example. In the following description, for ease of explanation, assume that there is only one call reason for one call.

The operator terminal 20 can refer to a variety of terminals that are used by operators who answer queries from customers, such as PCs (Personal Computers), and functions as an IP (Internet Protocol) telephone.

The administrator terminal 30 can refer to a variety of terminals such as PCs that are used by administrators who manage the operators (these administrators may be also referred to as "supervisors").

The PBX 40 is a telephone exchange (IP-PBX) and connected to a communication network 70, including a VoIP (Voice over Internet Protocol) network, a PSTN (Public Switched Telephone Network), and so forth.

The customer terminal 50 can refer to a variety of terminals that are used by customers, such as smartphones, mobile phones, and landlines.

The time-stamping authority 60 is a time-stamping authority that is run or managed by a trusted business operator of time-stamping services. In response to a request from the authentication management device 10, the time-stamping authority 60 returns a time stamp token, in which time information is assigned to the hash value included in that request.

Note that the overall configuration of the contact center system 1 shown in FIG. 1 is an example, and other configurations may be applicable as well. For example, although, in the example shown in FIG. 1, the authentication management device 10 is included in the contact center environment (that is, the authentication management device 10 is an on-premise type), part or all of the functions of the authentication management device 10 may be realized by cloud services or the like. Similarly, in the example shown in FIG. 1, the PBX is an on-premise type telephone exchange, but may as well be realized by cloud services. Furthermore, although the operator terminal 20 has been described to function as an IP telephone, for example, apart from the operator terminal 20, a telephone may be included in the contact center system 1 as well. Furthermore, for example, a device (for example, a gateway device) to connect between the contact center environment E and an external network may function as the authentication management device 10.

<Configuration of Time-Stamping>

In this embodiment, time-stamping is set for the necessary range (setting range) of the necessary data (hereinafter also referred to as "target data"). Here, the target data refers to the data where time-stamping is set, amongst the voice data and text data contained in the call data. Furthermore, the setting range refers to the range where time-stamping is set, within the time range of the target data.

Figure 2:
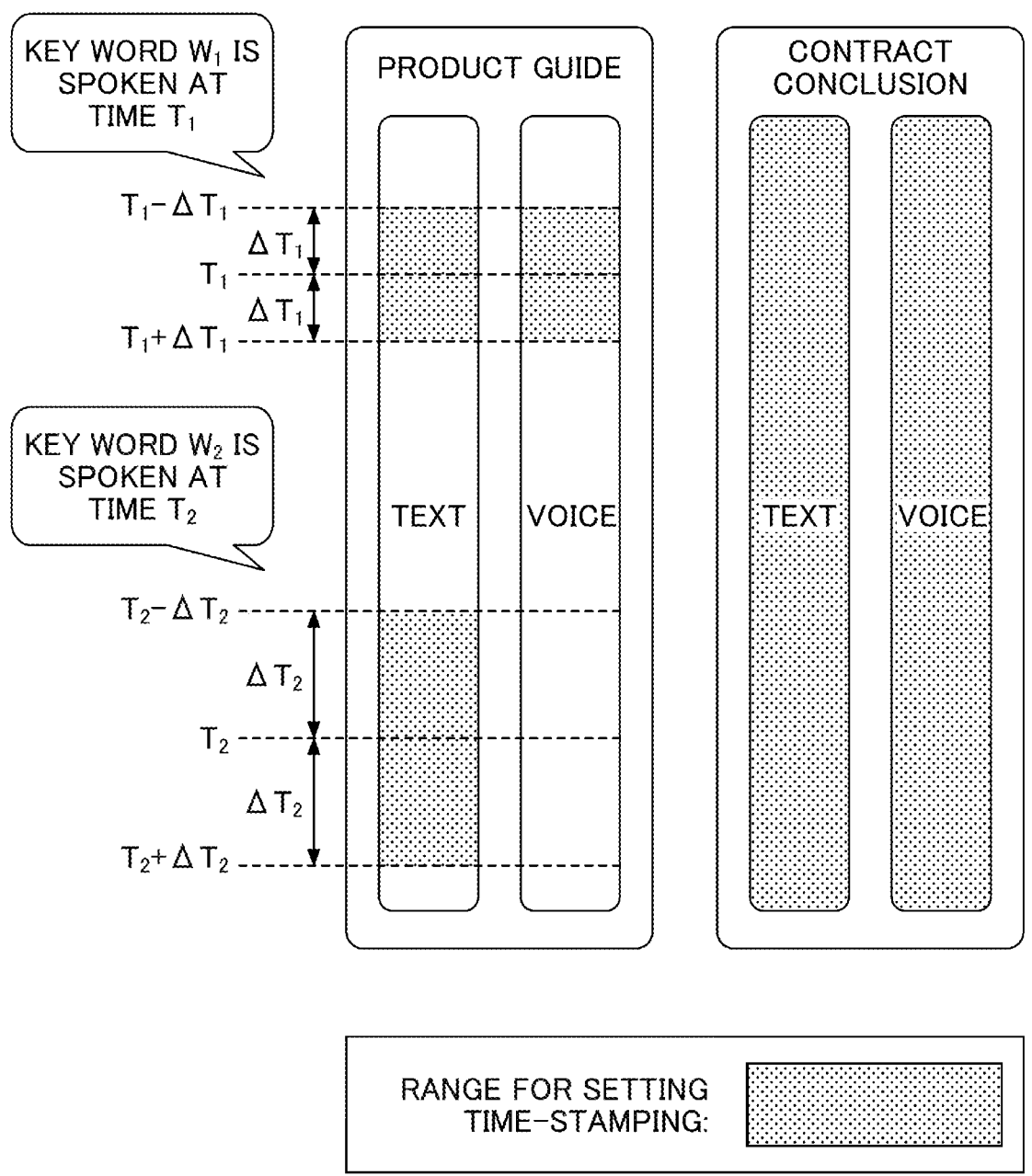
FIG. 2 is a diagram for schematically explaining an example of setting time-stamping.

Now, an example of setting time-stamping according to the present embodiment will be described below with reference to FIG. 2. FIG. 2 is a diagram for schematically explaining an example of setting time-stamping.

The example shown on the left side of FIG. 2 is a case where a certain key word $W_1$ is spoken at a time $T_1$ and a certain key word $W_2$ is spoken at a time $T_2$, in a call related to the call reason "product guide." In this case, for example, time-stamping is set so that voice data and text data are the target data, and the time range from time $T_1 - \Delta T_1$ to time $T_1 + \Delta T_1$ (that is, the range of $\Delta T_1$ before and after the time term $W_1$ is spoken) is the setting range. Furthermore, for example, time-stamping is set so that text data is the target data, and the time range from time $T_2 - \Delta T_2$ to time $T_2 + \Delta T_2$ (that is, the range of $\Delta T_2$ before and after the time term $W_2$ is spoken) is the setting range. This is because the content spoken before and after a key word is spoken is also likely to contain an important matter, and it is therefore only appropriate to apply time-stamping to that spoken content as well.

Note that a key word is a term, phrase, and so forth, that is important in relationship to the call reason. For example, when answering a query related to the call reason "product guide," the operator needs to give a full explanation of the product's price, details of warranty, and so forth. In this case, terms such as "charge" and "warranty" are important words. Hereinafter, these "important words" will be also referred to simply as "key words."

The example shown on the right side of FIG. 2 is a case where a call related to the call reason "contract conclusion" is made. In this case, for example, time-stamping is set so that the voice data and text data are the target data, and the whole time range from the start to the end of the call is the setting range. This is because, for example, if a call relates to "contract conclusion," the whole content spoken during the call may be an important matter, and it is therefore only appropriate to make the text data and voice data the target data, and apply time-stamping to the whole of the call from the start to the end.

As described above, with the present embodiment, time-stamping is set for a given time range (including the whole time range), with one or both of voice data and text data as target data, depending on the call reason or key words spoken during the call. This makes it possible to set time-stamping for an appropriate range of appropriate data, depending on the importance of the call reason of the call, the importance of key words spoken during the call, and so forth. Therefore, for example, compared to the case where time-stamping is set for all call data indistinguishably, the costs incurred for time-stamping can be reduced.

Note that, as will be described later, which data is the target data and to which time range time-stamping is applied are configured in advance, based on conditions (rules) such as call reasons, key words, and so forth.

<Functional Configuration>

Figure 3:
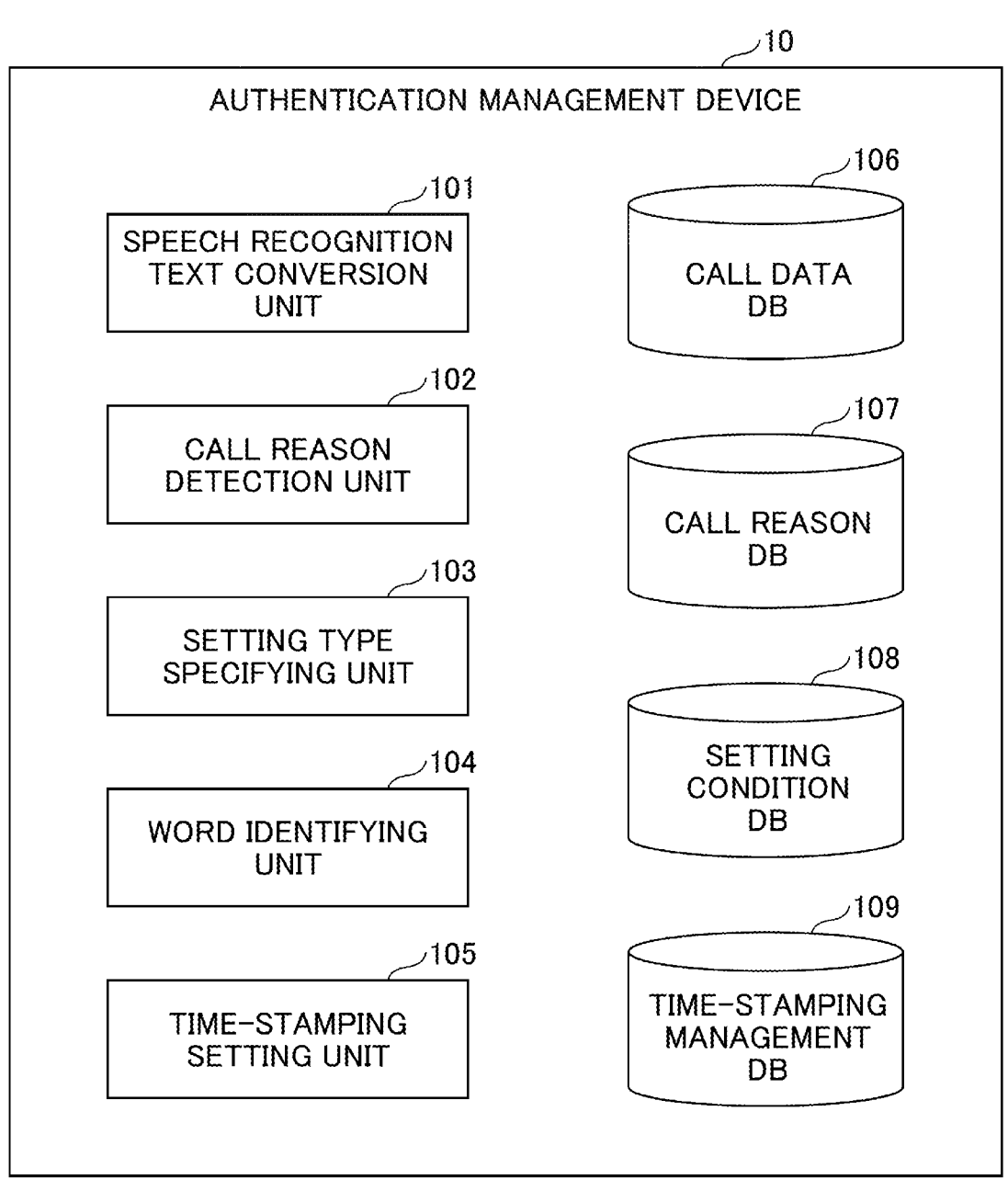
FIG. 3 is a diagram showing an example of a functional configuration of an authentication management device according to the present embodiment.

Next, a functional configuration of the authentication management device 10 according to the present embodiment will be described below with reference to FIG. 3. FIG. 3 is a diagram showing an example of a functional configuration of the authentication management device 10 according to the present embodiment.

As shown in FIG. 3, the authentication management device 10 according to the present embodiment has a speech recognition text conversion unit 101, a call reason detection unit 102, a setting type specifying unit 103, a word identifying unit 104, and a time-stamping setting unit 105. These units are each implemented, for example, as a process, in which one or more programs installed in the authentication management device 10 are executed on a processor such as a CPU (Central Processing Unit).

Furthermore, the authentication management device 10 according to the present embodiment has a call data DB 106, a call reason DB 107, a setting condition DB 108, and a time-stamping management DB 109. These DBs (databases) are each implemented using, for example, a storage device such as a secondary storage device. Note that at least one of these DBs may be implemented using, for example, a database server connected to the authentication management device 10 via a communication network.

The speech recognition text conversion unit 101 converts a voice call between an operator terminal 20 and a customer terminal 50 into text, using speech recognition. Furthermore, when doing so, the speech recognition text conversion unit 101 performs speech recognition per speaker, and converts the speaker's voice into text. As a result of this, the operator's voice and the customer's voice are both converted into text.

Note that this speech recognition is executed repeatedly, while a voice call is in progress between the operator terminal 20 and the customer terminal 50 (for example, speech recognition may be executed every few seconds, or may be executed for every term or phrase spoken by the customer or the operator).

Now, the voice data representing the voice call between the operator terminal 20 and the customer terminal 50, and the text data representing the text obtained by converting the voice call in the speech recognition text conversion unit 101 are stored in the call data DB 106 as call data, for example, after the call is over. That is, the call data DB 106 stores call data, containing voice data and text data, on a per call basis. Furthermore, the voice data contains the operator's voice data (hereinafter also referred to as "operator voice data"), and the customer's voice data (hereinafter also referred to as "customer voice data"). Similarly, the text data contains the operator's text data and (hereinafter also referred to as "operator text data") and the customer's text data (hereinafter also referred to as "customer text data"). Note that the call data also contains, for example, information such as the call ID, which identifies the call.

Referring to the call reason DB 107, the call reason detection unit 102 detects the call reason from the text converted in the speech recognition text conversion unit 101. Here, the call reason DB 107 is a database, in which information for detecting the call reason from the spoken content of the customer and/or the operator is stored. The details of the call reason DB 107 will be described later.

Referring to the setting condition DB 108, the setting type specifying unit 103 specifies the type of setting from the call reason detected in the call reason detection unit 102. This setting type indicates whether the whole time range of a call from the start to the end is made the setting range, or part of that time range is made the setting range. Hereinafter, the setting type will assume one of "all," which indicates that the whole time range of a call, from the start to the end, is made the setting range, and "part," which indicates that a partial time range in the whole time range of a call is made the setting range. Here, the setting condition DB 108 is a database, in which information for determining the target data and setting range based on the call reason and key words is stored. The details of the setting condition DB 108 will be described later.

When the setting type specifying unit 103 specifies the setting type "part," the word identifying unit 104 refers to the setting condition DB 108, and determines whether key words appear in the text converted in the speech recognition text conversion unit 101.

Referring to the setting condition DB 108, the time-stamping setting unit 105 sets time-stamping for all or part of the target data. That is, when the setting type specifying unit 103 specifies the setting type "all," the time-stamping setting unit 105 refers to the setting condition DB 108, and sets time-stamping so that all of the target data, corresponding to the call reason detected in the call reason detection unit 102, is the setting range. On the other hand, when the setting type specifying unit 103 specifies the setting type "part," the time-stamping setting unit 105 refers to the setting condition DB 108, and sets time-stamping for the target data and setting range, corresponding to the call reason detected in the call reason detection unit 102 and the key words appearing in the text converted in the speech recognition text conversion unit 101.

To be more specific, time-stamping is set as follows. That is, the time-stamping setting unit 105 calculates the hash value of the setting range of the target data, and then requests this hash value's time stamp token to the time-stamping authority 60. Then, when the time stamp token is returned from the time-stamping authority 60, the time-stamping setting unit 105 creates time-stamping information, which includes the time-stamping ID, the call ID, the call reason ID, the time stamp token, and so forth, and saves this time-stamping information in the time-stamping management DB 109. By this means, time-stamping information that is associated with call data based on the call ID is saved in the time-stamping management DB 109, and time-stamping is set for the setting range of target data, which is at least part of the call data. Note that the time-stamping ID is the ID to identify the time-stamping information. The details of the time-stamping management DB 109 will be described later.

<<Call Reason DB 107>>

Next, the call reason DB 107 will be described in detail with reference to FIG. 4. FIG. 4 is a diagram showing an example of the call reason DB 107.

As shown in FIG. 4, the call reason DB 107 stores information (data or records), in which call reason IDs, call reason names, and detection conditions are associated with each other.

The call reason ID is the ID to identify the call reason. The call reason name is the call reason's name. The detection condition is the condition to allow the call reason detection unit 102 to detect the call reason.

For example, the information in the first line of the call reason DB 107 shown in FIG. 4 is the call reason ID "a-1," the call reason name "PRODUCT GUIDE," and the detection condition "BOTH: INSURANCE." Similarly, for example, the information in the second line of the call reason DB 107 shown in FIG. 4 is the call reason ID "a-2," the call reason name "CONTRACT PROCEDURE," and the detection condition "BOTH: CONTRACT."

Now, with the present embodiment, as an example, the detection condition is given in the form of "speaker: term." This means that the detection condition is fulfilled when the speaker says that term. For example, the detection condition "both: insurance" means that the detection condition is fulfilled when both the operator and the customer say the term "insurance." Similarly, for example, the detection condition "customer: address change" means that the detection condition is fulfilled when the customer says the term "address change." Furthermore, although not illustrated in FIG. 4, for example, the detection condition "operator: a" means that the detection condition is fulfilled when the operator says the term "A."

However, the above format of detection condition is an example, and the detection condition may be given in various formats (for example, in a format such as logical expression).

<<Setting Condition DB 108>>

Next, the details of the setting condition DB 108 will be described below with reference to FIG. 5. FIG. 5 is a diagram showing an example of the setting condition DB 108.

As shown in FIG. 5, the setting condition DB 108 stores information (data or records), in which call reason IDs, setting types, key words, target data, and setting ranges are associated with each other.

The call reason ID is the ID to identify the call reason. The setting type is the type to indicate whether the whole time range of a call from the start to the end is made the setting range, or part of that time range is made the setting range. A key word is a term, phrase, and so forth, that is important in relationship to the call reason. The target data is the data targeted for setting time-stamping. The setting range is the time range that serves as the range in the target data for setting time-stamping. Note that information with the setting type "all" contains no key words (or contains NULL, empty values, and so forth, as key words).

For example, the information in the first line of the setting condition DB 108 shown in FIG. 5 is the call reason ID "a-1" and the setting type "PART" ((the key word "CHARGE," the target data "TEXT, VOICE" and the setting range "3 MINUTES BEFORE AND AFTER KEY WORD") (the key word "WARRANTY," the target data "TEXT" and the setting range "5 MINUTES BEFORE AND AFTER KEY WORD"), . . . ). This means that the setting type for the call data of the call reason ID "a-1" is "PART," and, when the key word "charge" is spoken, 3 minutes before and after that key word is spoken is the range for setting time-stamping, and the text data and voice data are the target data, or, when the key word "WARRANTY" is spoken, 5 minutes before and after that key word is spoken is the range for setting time-stamping, and the text data is the target data.

Similarly, for example, the information in the second line of the setting condition DB 108 shown in FIG. 5 is the call reason ID "a-2," the setting type "ALL," the target data "TEXT, VOICE," and the setting range "WHOLE PERIOD." This means that the setting type for the call data of the call reason ID "a-2" is "ALL," the text data and voice data are the target data, and the whole period (that is, the whole time range) is the range for setting time-stamping.

However, the above setting ranges are simply examples, and various time ranges can be defined. For example, it is possible to define a period of time before or after a key word is spoken, such as "3 minutes before a key word is spoken," "5 minutes after a key word is spoken," and so forth. Furthermore, for example, "5 minutes after 1 minute passed after a key word is spoken" or the like may be defined as well. Apart from these time ranges, for example, a clause or a segment of a sentence, in which a key word is contained, may be defined as the setting range. Also, a range in which a conjunction to mark a turning point in a conversation serves as the starting point and the end point, or a predetermined range in which that conjunction serves as a reference point, may be defined as the setting range. Furthermore, a range of exchange in a conversation that is held between an operator and a customer, for example, upon identification of the contractor, checking the address, and so forth, may be extracted using natural language analysis, and the range to represent a specific scene in that extracted range may be defined as the setting range.

Furthermore, although cases will be described below with the present embodiment where one of "text data," "voice data" and "text data, voice data" is the target data, this is by no means limiting, and, for example, whether the speaker is the customer or the operator may be taken into account. That is, any one of "customer text data," "operator text data," "customer voice data," "operator voice data," "customer text data, operator text data," "customer text data, customer voice data," "customer text data, operator voice data," "operator text data, customer voice data," "operator text data, operator voice data," "customer voice data, operator voice data," "customer text data, operator text data, customer voice data," "customer text data, operator text data, operator voice data," "customer text data, customer voice data, operator voice data," "operator text data, customer voice data, operator voice data," and "customer text data, operator text data, customer voice data, operator voice data" may be the target data.

<Flow of Time-Stamping Process>

Figure 6:
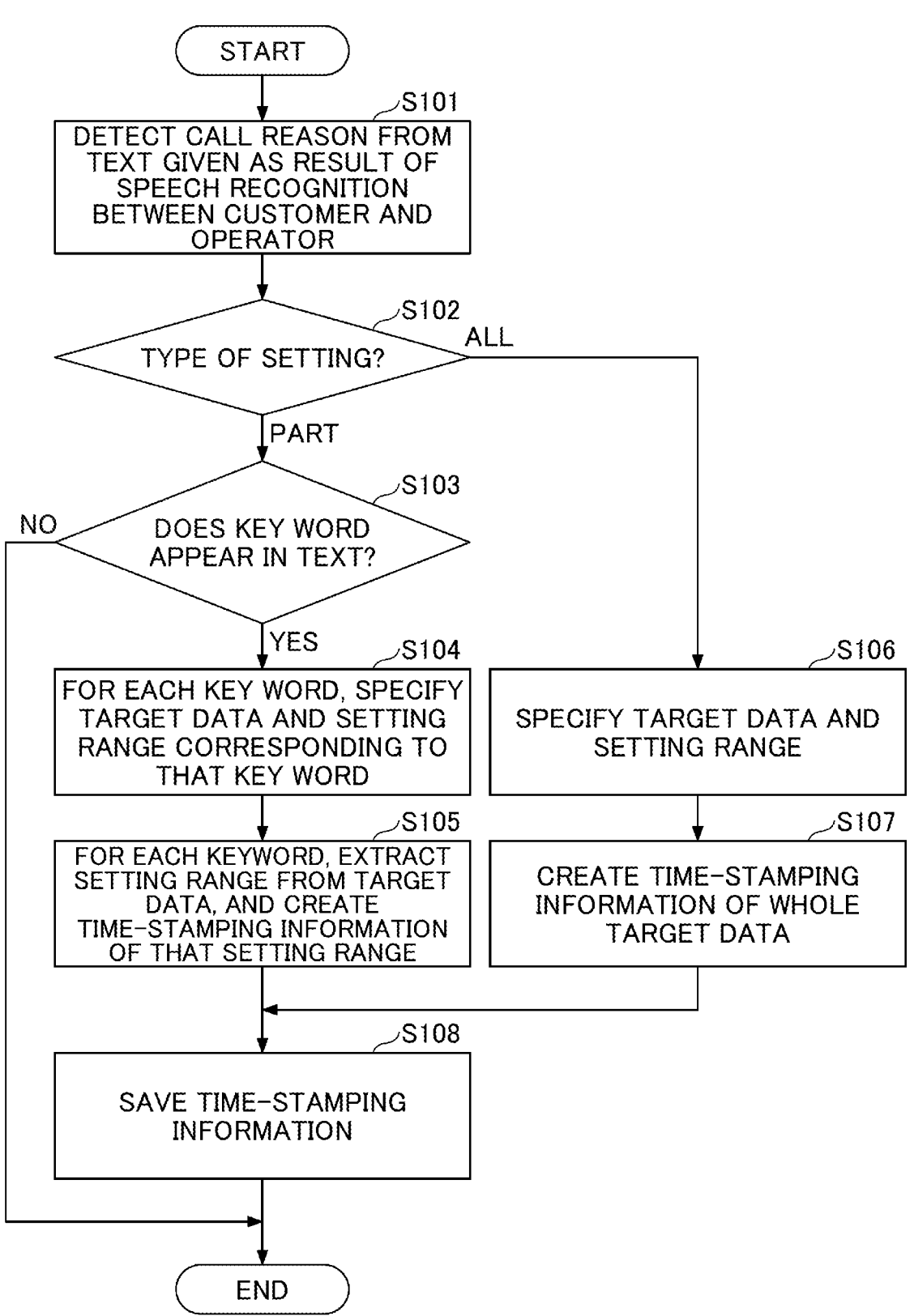
FIG. 6 is a flowchart showing an example flow of the time-stamping process.

Now, a case will be described below with reference to FIG. 6, in which time-stamping is set for given call data, assuming that the call data, containing voice data to represent a voice call between the operator terminal 20 and the customer terminal 50, text data to represent the text, obtained by converting this voice call into text in the speech recognition text conversion unit 101, and the voice call's call ID, is stored in the call data DB 106. FIG. 6 is a flowchart showing an example of the flow of the time-stamping process.

Referring to the call reason DB 107, the call reason detection unit 102 detects the call reason from the text represented by the text data contained in the call data (step S101). That is, the call reason detection unit 102, referencing to each record stored in the call reason DB 107, determines whether or not there is a record with text that fulfills the detection condition. Then, upon finding a record that fulfills the detection condition, the call reason detection unit 102 specifies that record's call reason ID and call reason name. By this means, the call reason ID and the call reason name are detected.

Next, referring to the setting condition DB 108, the setting type specifying unit 103 specifies the setting type from the call reason detected in above step S101 (step S102). That is, the setting type specifying unit 103 refers to the record of the call reason ID detected in above step S101, and specifies whether the setting type contained in this record is "all" or "part," among the records stored in the setting condition DB 108.

When the setting type "part" is specified in above step S102, the word identifying unit 104 refers to the setting condition DB 108, and determines whether or not key words appear in the text (step S103). That is, the word identifying unit 104 refers to the record of the call reason ID detected in above step S101, among the records stored in the setting condition DB 108, and determines whether key words contained in this record appear in the text (step S103).

When above step S103 determines that the key words do appear, the time-stamping setting unit 105 refers to the setting condition DB 108, and specifies, for each key word that appears in the text, the corresponding target data and setting range (step S104). That is, among the records stored in the setting condition DB 108, the time-stamping setting unit 105 refers to the record of the call reason ID detected in above step S101, and specifies, for each key word that appears in the text, the target data and setting range corresponding to that key word.

For example, when the call reason ID "a-1" is detected in above step S101 and the key words "charge" and "warranty" are determined to appear in the text in above step S103, the time-stamping setting unit 105 specifies the target data "text, voice" and the setting range "3 minutes before and after key word," and specifies the target data "text" and the setting range "5 minutes before and after key word."

Note that, if above step S103 determines that no key words appear, the authentication management device 10 ends the time-stamping process. In this case, time-stamping is not set.

Next, for every key word that appears in the text, the time-stamping setting unit 105 sets time-stamping for the target data and the setting range corresponding to that key word (step S105). That is, for each key word that appears in the text, the time-stamping setting unit 105 extracts a setting range from the target data corresponding to that key word, calculates its hash value, and then requests this hash value's time stamp token to the time-stamping authority 60. Then, when the time stamp token associated with that key word is returned from the time-stamping authority 60, the time-stamping setting unit 105 creates a time-stamping ID, and then creates time-stamping information, which includes this time-stamping ID, the call data's call ID, the call reason ID, the key word, the target data and setting range corresponding to the key word, and the time stamp token.

By this means, time-stamping information is created for each key word that appears in the text. For example, if the key words "charge" and "warranty" appear in the text, time-stamping information corresponding to "charge" and time-stamping information corresponding to "warranty" are created.

Note that, if the same key word appears a number of times in the text, these instances are distinguished for manner of treatment. For example, when the key word "charge" appears twice in the text, time-stamping information to correspond to the "charge" appearing the first time, and time-stamping information to correspond to the "charge" appearing the second time are created. However, for example, when the same key word appears a number of times in the text, it may not be necessary to distinguish between them. This is so when, for example, the key word "charge" appears a number of times in 3 minutes. This is to avoid setting time-stamping in an overlapping manner when there are partially overlapping setting ranges. Furthermore, for example, when at least part of a number of setting ranges overlap, or when a number of setting ranges are provided, although not overlapping, at time intervals equal to or less than a predetermined threshold (that is, when a number of setting ranges are close), it then may not be necessary to distinguish between the key words corresponding to each of these setting ranges, or these setting ranges may be grouped into one.

When the setting type "all" is specified in above step S102, the time-stamping setting unit 105 refers to the setting condition DB 108, and specifies the target data and setting range corresponding to the call reason detected in above step S101 (step S106). That is, the time-stamping setting unit 105 refers to the record of the call reason ID detected in above step S101, among the records stored in the setting condition DB 108, and specifies the target data and setting range contained in this record.

For example, when the call reason ID "a-2" is detected in above step S101, the time-stamping setting unit 105 specifies the target data "text, voice" and the setting range "whole period."

However, since the setting type "all" is specified in above step S102, it is not always necessary to specify the setting range. This is because the setting type "all" means that time-stamping is set so that the whole period of the target data is the setting range.

Next, the time-stamping setting unit 105 sets time-stamping for the whole target data (step S107). That is, the time-stamping setting unit 105 calculates the hash value of the setting range of the target data (that is, the whole period of the target data) specified in above step S106, and then requests this hash value's time stamp token to the time-stamping authority 60. Then, when the time stamp token is returned from the time-stamping authority 60, the time-stamping setting unit 105 creates a time-stamping ID, and then creates time-stamping information, which includes this time-stamping ID, the call ID of the call data, the call reason ID, the target data and setting range corresponding to the call reason ID, and the time stamp token. By this means, time-stamping information is created for the whole target data.

Following above step S105 or step S107, the time-stamping setting unit 105 saves the time-stamping information created, in the time-stamping management DB 109 (step S108). By this means, time-stamping is set for the setting range of the target data, which is at least part of the call data (including the case where the whole period is the setting range).

Now, FIG. 7 shows an example of time-stamping information stored in the time-stamping management DB 109. The time-stamping information in the first line of the time-stamping management DB 109 shown in FIG. 7 is the time-stamping ID "T001," the call ID "C001," the call reason ID "a-1," the key word "CHARGE," the target data "TEXT, VOICE," the setting range "3 MINUTES BEFORE AND AFTER KEY WORD," and the time stamp token. This means that the text data and voice data contained in the call data of the call ID "C001" are the target data, and the time stamp token of the setting range of 3 minutes before and after the key word "CHARGE" is spoken is set for time-stamping.

Similarly, the time-stamping information on the third line of the time-stamping management DB 109 shown in FIG. 3 is the time-stamping ID "T003," the call ID "C002," the call reason ID "a-2," the key word "-," the target data "TEXT, VOICE," the setting range "WHOLE PERIOD," and the timestamp token. This means that the text data and voice data contained in the call data of the call ID "C002" are the target data, and the time stamp token of the whole period is set for time-stamping.

As described above, the authentication management device 10 according to the present embodiment makes part or all of the data contained in the call data of a voice call between an operator and a customer the target data, depending on the call reason of the voice call, key words spoken during the call, and so forth, and sets time-stamping for all or part of the time range of this target data. This makes it possible to set time-stamping for an appropriate range of appropriate data, depending on the importance of the call reason of the call, the importance of words spoken during the call, and so forth. Therefore, for example, compared to the case where time-stamping is set for all call data indistinguishably, the costs incurred for time-stamping can be reduced.

Note that, although a case has been described with the above embodiment where time-stamping is applied to given call data stored in the call data DB 106, this is by no means limiting, and it is equally possible to use time-stamping on a real-time basis while a call is in progress between an operator and a customer. In this case, for example, the starting time point of the setting range may be specified by the exchange between the operator and the customer, and, at the end of the setting range or the end of the call, or when the end condition is fulfilled using natural language processing, the time-stamping information of above step S105 or step S107 may be created. Furthermore, when doing so, that is, when creating time-stamping information, the hash value may be calculated so as to include not only the data in the setting range, but also the current time. Now, the above-mentioned end condition using natural language processing may be one that is fulfilled when, for example, a clause or a segment of a sentence appears, a conjunction to mark a turning point in a conversation appears, and so forth.

<Modifications>

Now, a number of modifications of the present embodiment will be described below.

<βModification 1>>

Although the above embodiment has been described so that the setting range starts at a point a key word is spoken, and spans time ranges such as before, after, and before and after that point, it is equally possible to use, for example, a certain act that the operator performs as the above starting point. For example, when the call reason is "contract procedure," the operator may open an electronic file of terms and conditions, and read the contents of the terms and conditions aloud. So, for example, the act of "opening an electronic file of terms and conditions" may serve as the above starting point, and a time range before, after, or before and after that act may define the setting range.

Note that the above act of "opening an electronic file of terms and conditions" can be detected by, for example, monitoring the folder in which the electronic file of terms and conditions is stored. Consequently, the present modification can be realized by, for example, including information to show the access date and time of the electronic file, in the call data. Other acts like this may include, for example, the act of scrolling down the terms and conditions file to the end, and, if text chat is available, the operator's act of sending the terms and conditions file to the customer as an attachment, the customer's act of opening the terms and conditions file, and so forth. Furthermore, if video call is available, the operator's act of sharing and displaying the terms and conditions file on the customer's screen, the act of displaying the terms and conditions file for a certain period of time, and so forth may be used as well.

Note that when, for example, words or acts related to an important matter are spoken or performed, such words and acts may be collectively referred to as "behavior."

<<Modification 2>>

Although, in step S101 of FIG. 6, the call reason is detected from the text represented by text data, it is equally possible to, for example, specify and detect the call reason from the number that the customer enters via the customer terminal 50 following the guidance from the IVR (Interactive Voice Response) system. In this case, it is possible to realize this modification by including, in the call data, information to represent the guidance from the IVR system, information to represent the number the customer has entered in the customer terminal 50 following that guidance, and so forth.

<Modification 3>>

Although a case has been described above with the present embodiment where one call has only one call reason for ease of explanation, generally, one call may have a number of call reasons. For example, a customer may call a call center for two reasons: address change procedure and contract plan change.

In cases like this (that is, when a number of call reasons are detected in step S101 of FIG. 6), the call data may be divided per call reason, and step S102 and the subsequent steps may be executed for each divided call data. Note that there are a number of ways to divide call data, and, for example, when a call reason A is detected at time $T_1$ and a call reason B is detected at time $T_2$, the method of dividing the call data at time $T_2 - \Delta T$ (where $\Delta T$ is a predetermined period of time) may be used. This is because, even at a time slightly before the time a certain call reason is detected, the conversation related to the same call reason is likely to be in progress then.

<<Modification 4>>

Although a case been described above with the present embodiment where text data or voice data, or both, contained in the setting range in call data, are subject to time-stamping, it is also possible to make the data associated with that setting range subject to time-stamping. For example, speech recognition function-related data (for example, speech recognition model, and/or the like) used to convert the voice data in the setting range into text data, software or programs that have executed some processing on data in the setting range, among the software or programs provided in the authentication management device 10, libraries used by these software or programs, and so forth may also be subject to time-stamping as well. This makes it possible to check, for example, whether appropriate processing has been performed on data where time-stamping is set, where the responsibility for defects (responsibility for nonconformity) lies in the event of troubles or inconveniences occurring, and so forth.

The present disclosure is not limited to these embodiments, but various variations and modifications may be made without departing from the scope of the present invention.

The present application is based on and claims priority to Japanese Patent Application No. 2021-059678, filed on Mar. 31, 2021, with the Japan Patent Office, the entire contents of which are hereby incorporated by reference.

REFERENCE SIGNS LIST

1 Contact center system
10 Authentication management device
20 Operator terminal
30 Administrator terminal
40 PBX
50 Customer terminal
60 Time-stamping authority
70, 80 Communication network
101 Speech recognition text conversion unit
102 Call reason detection unit
103 Setting type specifying unit
104 Word identifying unit
105 Time-stamping setting unit
106 Call data DB
107 Call reason DB
108 Setting condition DB
109 Time-stamping management DB

What is claimed is:

1. An information processing device comprising a processor configured to execute operations comprising:

retrieving conversation data of a conversation between a customer and an operator, wherein the operator uses an operator terminal, the customer uses a customer terminal, and the operator terminal and the customer terminal communicate over a first communication network through a telephone exchange;

automatically extracting, based on a predetermined rule, a range of the conversation data for certifying authenticity of the range of the conversation data as having existed at a time of time-stamping, wherein the predetermined rule identifies, based on a call reason the conversation data, the range of the conversation data;

the predetermined rule specifies, based on the call reason, a time of starting the range, the predetermined rule further specifies, based on a keyword appearing in the range of the conversation data, a time duration of the automatically extracted range of the conversation data for time-stamping certification, and the keyword appearing in the range represents need to maintain authenticity of the range of the conversation data at a time of the conversation taking place and have been untampered with as certified;

selectively generating, through communication with a server over a second communication network, certified time-stamping data of the automatically extracted range of the conversation data, wherein the certified time-stamping data comprise a time-stamp by receiving from the server the time-stamp and hash data of the automatically extracted range of the conversation data as certified information, thereby reducing a number of occurrences of performing time-stamping for certification through communication over the second communication network as compared to retrieving certified time-stamping on each range of the conversation data; and storing and presenting the automatically extracted range of the conversation data as a certified portion of the conversation according to the selectively generated certified time-stamping data.

2. The information processing device according to claim 1, wherein the automatically extracting further comprises automatically extracting the range based at least in part on the conversation data, depending on content of a query from a first speaker to a second speaker.

3. The information processing device according to claim 2, the processor further configured to execute operations comprising:

detecting the content of the query from the content of the conversation, wherein the automatically extracting further comprises automatically extracting the range based on part or all of the conversation data, depending on the detected content of the query.

4. The information processing device according to claim 3, the processor further configured to execute operations comprising:

converting the content of the conversation into text using speech recognition, wherein the detecting further comprises detecting the content of the query from the text obtained by converting the content of the conversation.

5. The information processing device according to claim 2, wherein:

the automatically extracting further comprises automatically extracting the range based on a target, the target being at least a part the conversation data, and the range being at least a part of a time range of the target; and the generating further comprises setting time-stamping for the range of the target.

6. The information processing device according to claim 5, wherein the automatically extracting further comprises automatically extracting the target and the range based on the content of the query and an important matter in the content of the conversation.

7. The information processing device according to claim 6, wherein the automatically extracting further comprises automatically extracting the target and the range based on the content of the query, or based on the content of the query and the important matter in the content of the conversation.

8. The information processing device according to claim 6, wherein the automatically extracting further comprises automatically extracting the range based on a predetermined range, the predetermined range starting from a time the important matter appears.

9. The information processing device according to claim 8, wherein the important matter comprises at least one of: when a predetermined important word is spoken, or when a predetermined important act is performed.

10. The information processing device according to claim 4, wherein the automatically extracting further comprises automatically extracting the range based on at least one of a range represented by a clause or a segment of a sentence containing a predetermined word, in the text obtained by converting the content of the conversation, a range where a predetermined conjunction serves as a starting point and an end point, a predetermined range where the predetermined conjunction serves as a reference point, and a range to represent a specific scene in a range extracted from the text using natural language analysis.

11. The information processing device according to claim 1, wherein the keyword, based on the need to maintain authenticity of the range of conversation data at the time of the conversation taking place and have been untampered with according to the call reason, specifies the time of starting the automatically extracted range and the time duration of the automatically extracted range of the conversation data for time-stamping certification.

12. An information processing method to be executed on a computer, comprising:

a retrieving step of retrieving conversation data of a conversation between a customer and an operator, wherein the operator uses an operator terminal, the customer uses a customer terminal, and the operator terminal and the customer terminal communicate over a first communication network through a telephone exchange;

an automatically extracting step of automatically extracting, based on a predetermined rule, a range of the conversation data for certifying authenticity of the range of the conversation data as having existed at a time of setting the time-stamping, wherein the predetermined rule identifies, based on a call reason of the conversation data, the range of the conversation data;

the predetermined rule specifies, based on the call reason, a time of starting the range, and further specifies, based on a keyword appearing in the range of the conversation data, a time duration of the automatically extracted range of the conversation data, a time duration of the automatically extracted range of the conversation data for time-stamping certification, and the keyword appearing in the range represents need to maintain authenticity of the range of conversation data at a time of the conversation taking place and have been untampered with as certified:

a selectively generating step of selectively generating, through communication with a server over a second communication network, certified time-stamping data of the automatically extracted at least a part of the range of the conversation data, wherein the certified time-stamping data comprise a time-stamp by receiving from the server the time-stamp and hash data of the automatically extracted range of the conversation data as certified information, thereby reducing a number of occurrences of performing time-stamping for certification through communication over the second communication network as compared to retrieving certified time-stamping on each range of the conversation data; and storing and presenting the automatically extracting range of the conversation data as a certified portion of the conversation according to the selectively generated certified time-stamping data.

13. A non-transitory computer-readable storage medium storing a program for causing a computer to execute:

a retrieving step of retrieving conversation data of a conversation between a customer and an operator, wherein the operator uses an operator terminal, the customer uses a customer terminal, and the operator terminal and the customer terminal communicate over a first communication network through a telephone exchange;

an automatically extracting step of automatically extracting, based on a predetermined rule, a range of the conversation data for certifying authenticity of the range of the conversation data as having existed at a time of setting the time-stamping, wherein the predetermined rule identifies, based on a call reason of the conversation data, the range of the conversation data;

the predetermined rule specifies, based on the call reason, a time of starting the range, and further specifies, based on a keyword appearing in the range of the conversation data, a time duration of the automatically extracted range of the conversation data, a time duration of the automatically extracted range of the conversation for time-stamping certification, and the keyword appearing in the range represents need to maintain authenticity of the range of the conversation data at a time of the conversation taking place and have been untampered with as certified;

a selectively generating step of selectively generating, through communication with a server over a second communication network, certified time-stamping data of the automatically extracted at least a part of the specified range of the conversation data, wherein the certified time-stamping data comprise a time-stamp by receiving from the server the time-stamp and hash data of the automatically extracted range of the conversation data as certified information, thereby reducing a number of occurrences of performing time-stamping for certification through communication over the second communication network as compared to retrieving certified time-stamping on each range of the conversation data; and storing and presenting the automatically extracting range of the conversation data as a certified portion of the conversation according to the selectively generated certified time-stamping data.

* * * * *